UNITED STATES PATENT OFFICE.

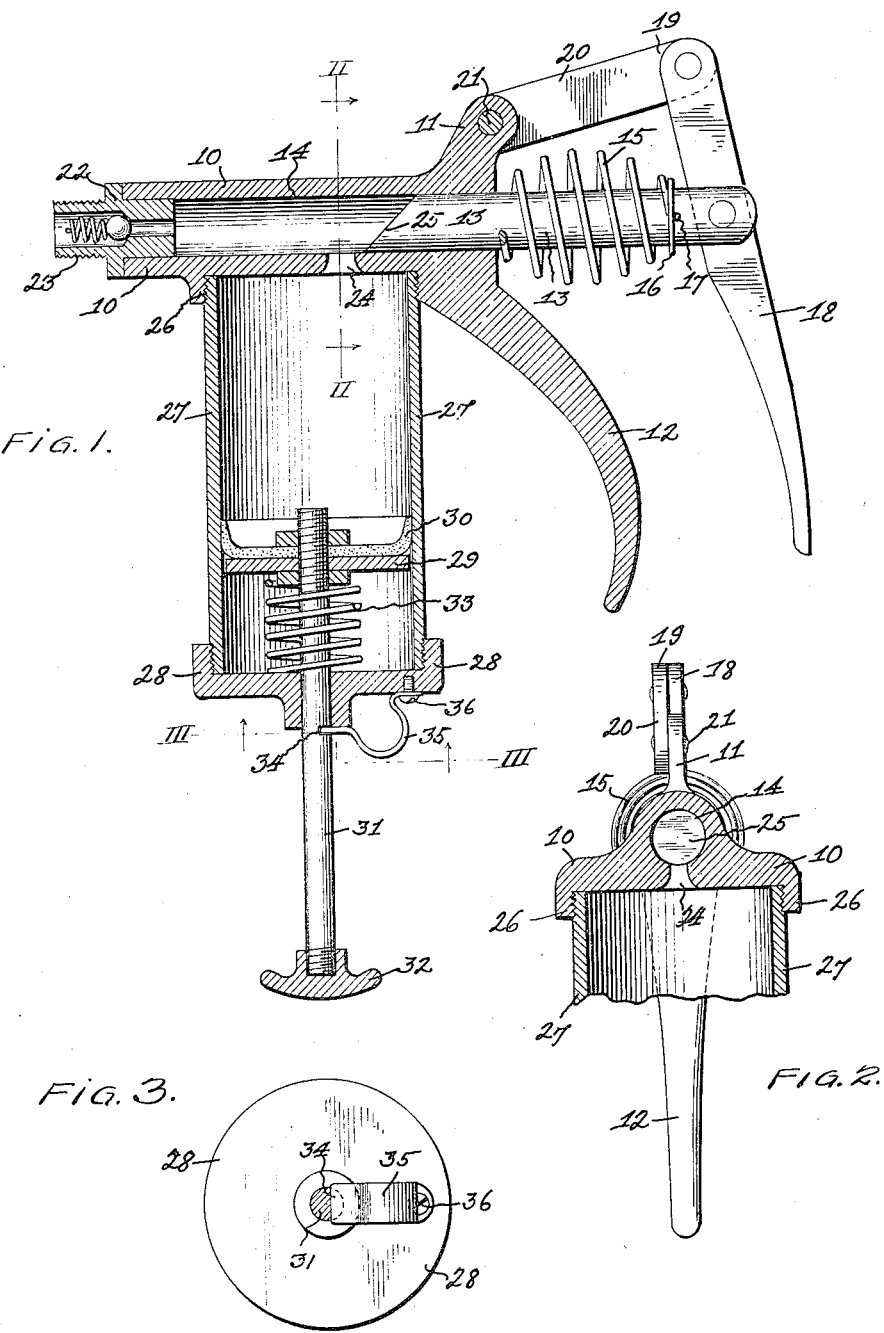

BERNARD S. NELSON, OF NEW ORLEANS, LOUISIANA.

LUBRICATING DEVICE.

1,377,023.

Specification of Letters Patent. Patented May 3, 1921.

Application filed June 29, 1920. Serial No. 392,749.

*To all whom it may concern:*

Be it known that I, BERNARD S. NELSON, a citizen of the United States, residing in the city of New Orleans, parish of Orleans, and State of Louisiana, have invented a new and useful Improvement in Lubricating Devices, of which the following is a specification.

The invention relates to lubricating devices and more especially to that class of articles known in the trade as "grease guns," which are used for the purpose of quickly and easily supplying a regulated quantity of lubricant to parts of an automobile or other mechanism receiving periodic lubrication.

The objects of my invention are:—

First, to provide a device of the character described which is well balanced, easily handled and manipulated and the time to effect its operations and cost of manufacture reduced to a minimum.

Second, to construct and arrange the different parts of the device whereby they can be cheaply manufactured, easily assembled or taken apart for inspection or repairs and avoid all waste or leakage of the lubricant from the device while in use, or when set aside and lubricating feeding operations are discontinued.

Third, other advantages of construction, means of assembling and method of operations will be apparent and fully understood from the detailed description and mode of using the same to be hereinafter described.

The invention consists of structural characteristics and relative arrangements of elements which will be hereinafter more fully described and particularly pointed out in the appended claims.

In the drawings in which similar reference characters indicate the same parts in the several figures,—

Figure 1 is a longitudinal section of the device.

Fig. 2 is a section on line II—II of Fig. 1.

Fig. 3 is a section on line III—III of Fig. 1.

Referring to the drawings, 10 is the plunger cylinder, provided at one of its ends with a lug 11 and a depending piston grip or handle 12. A plunger 13 slides in and out of the closely fitted bore 14 of the cylinder 10, said plunger 13 being forced out of the cylinder 10 by means of a coil spring 15. One end of said spring 15 abuts against the outer section of the cylinder 10 and the other end reacts against a collar 16 held by a pin 17 passing through the plunger 13, as shown. The plunger 13 is forced into bore 14 of the cylinder 10 by means of the lever 18 pivotally connected between its ends to the outer and bifurcated end of the plunger 13 beyond the collar 16. One of the ends of the lever 18 is pivotally connected to the free end 19 of a link 20 pivoted to the lug 11 by means of a pin 21.

Within the bore 14 at the other end of the cylinder 10 from that of the handle or grip 12 is secured a check valve 22, having its outer end preferably provided with threads 23 for the purpose of attaching any means for conveying the lubricant or grease forced from the cylinder 10 to the cups to be filled or parts to be lubricated. The cylinder 10 is provided with an opening or port 24 preferably on its lower side and the inner end of this plunger is beveled as shown at 25, so that its lower edge passes first over the port 24, for purposes to be presently described.

Secured preferably to the underside of the cylinder 10 by means of a threaded flange 26, is a grease, oil, or other lubricant receptacle or chamber 27, having a removable cover 28, and so disposed as to have the interior of the receptacle 27 communicate through the port 24 with the bore 14 of the cylinder 10, and said receptacle 27 preferably depending from the cylinder 10, so as to have the device in stable equilibrium when in use.

Within the receptacle 27 is provided a piston or follower 29 having a leather cup 30 arranged as shown, and connected to a rod 31 having a knob 32, and passing through the removable cover 28. Interposed between the piston or follower 29 and the inner side of the cover 28 and surrounding the rod 31, is a coil spring 33 which normally tends to push the follower 29 toward the port 24 and force the lubricant into the bore 14 of cylinder 10. 34 is a notch or slit in the rod 31, so constructed as to receive one end of a bent leaf spring 35 having its other end secured to the cover 28 by a screw 36 for the purpose of holding the follower or piston 29 in the position shown in Fig. 1 and arrest the action of the spring 33.

The operation of the invention is as follows:

The parts being in the position shown in Fig. 1, the receptacle 27 is screwed off or disengaged from the threaded flange 26 of the cylinder 10 and its interior is tightly packed with grease until the space between its open end and the leather cap 30 is filled with grease and then screwed back into engagement with the flange 26 as illustrated.

The rod 31 is then given a half turn which disengages the free end of the spring 35 from the notch 34 and permits the coil spring 33 to act against the piston or follower 29 and force the grease in the receptacle 29 through the port 24 into the bore 14 of the cylinder 10. The device is then taken hold of by the hand grasping the pistol grip or handle 12 and lever 18, and by closing the hand, the lever 18 is made to rock on the end 19 of link 20 and its free end is forced toward the handle 12. This movement of the lever 18 causes the plunger 13 to be forced into the bore 14 of the cylinder 10 against the action of the spring 15, and the grease within the bore 14 is gradually and properly pushed out of said bore 14 through the check valve 22 into any connected grease cup or conveying means attached thereto, as will be readily understood. When the pressure of the hand is released from the lever 18, the action of the spring 15 returns the plunger 13 to its normal position as shown in Fig. 1, when the action of the spring 33 causes the piston 29 to force grease again in the bore 14 as just described, and the operations indicated may be repeated as many times as desired, until the proper amount of lubricant has been thrust out of the check valve 22. This action of feeding the grease into the bore 14 is capable of being accomplished with or without assistance of the spring pressed piston 29, in view of the vacuum being produced in the bore 14 by the return stroke of the plunger beyond the port 24. It will also be seen that owing to the inner end of the plunger 13 having the bevel 25 arranged as shown with respect to the port 24, the forward or feeding stroke of the plunger 13 has the effect of pushing the grease upward or away from the port 24 and not back into the receptacle 27.

If it is desired to suspend the use of the device, the rod 31 is pulled out until the notch 34 is opposite to the end of spring 35, when it is turned through such an angle to permit the spring 35 to automatically slip into said notch 34 and lock the piston 29 against the action of spring 33, as shown in Fig. 1.

From the foregoing disclosure of the construction, assembling and operation of the device, all the objects and advantages recited in the statement of invention, are fully and efficiently carried out, and while I have shown one and the preferred form, it will be readily seen that many changes or modifications would readily suggest themselves to any one without departing from the essential features of the device or scope of invention as expressed in the claims, as for example any other means may be used for attaching or retaining the receptacle 27 on the plunger cylinder 10, and by the disclosed arrangement of plunger 13, bore 14, and port 24, the use of packing of any kind around the plunger 13, or a suction valve is entirely eliminated.

What I claim is:—

1. A lubricating device comprising a cylinder having a bore and an inlet port and a discharge passage, a plunger reciprocating within said bore, a lubricant receptacle attached to said cylinder and having its interior communicating with said bore through said inlet port, a piston within said receptacle for feeding the lubricant within the receptacle through said inlet port into said bore of the cylinder, a combined rotatable and reciprocating rod provided with a notch and connected to said piston, a spring catch adapted to engage said notch, and means connected to said plunger and cylinder for reciprocating said plunger within the bore to withdraw the lubricant from said receptacle into said bore and eject the lubricant from the bore through the discharge passage.

2. A lubricating device comprising a cylinder having a bore and an inlet port and a discharge passage, a plunger reciprocating within said bore, a lubricant receptacle attached to and depending from said cylinder and having its interior communicating with said bore through said inlet port, a spring actuated piston within said receptacle for feeding the lubricant within the receptacle through said inlet port into said bore of the cylinder, means for locking said piston against movement in the said receptacle, and means connected to said plunger and cylinder for reciprocating said plunger within the bore to withdraw the lubricant from said receptacle into said bore and eject the lubricant from the bore through the discharge passage.

3. A lubricating device comprising a cylinder having a bore and an inlet port and a discharge passage, a pistol grip on said cylinder, a plunger reciprocating within said bore, a spring connected to and forcing said plunger from the discharge passage, a lubricant receptacle attached to and depending from said cylinder and having its interior communicating with said bore through said inlet port, a piston within said receptacle for feeding the lubricant within the receptacle through said inlet port into said bore of the cylinder, and a lever pivotally connected to the cylinder and outer end of said plunger and having its free end in proximity of the pistol grip for reciprocating said plunger within the bore to withdraw the lubricant from said receptacle into said bore and eject the lubricant from the bore through the discharge passage.

In testimony whereof I affix my signature.

BERNARD S. NELSON.